June 10, 1947.　　　　　I. WOLFF　　　　　2,422,157

DISTANCE MEASURING APPARATUS

Filed July 31, 1942　　　　2 Sheets—Sheet 1

Inventor
IRVING WOLFF
Attorney

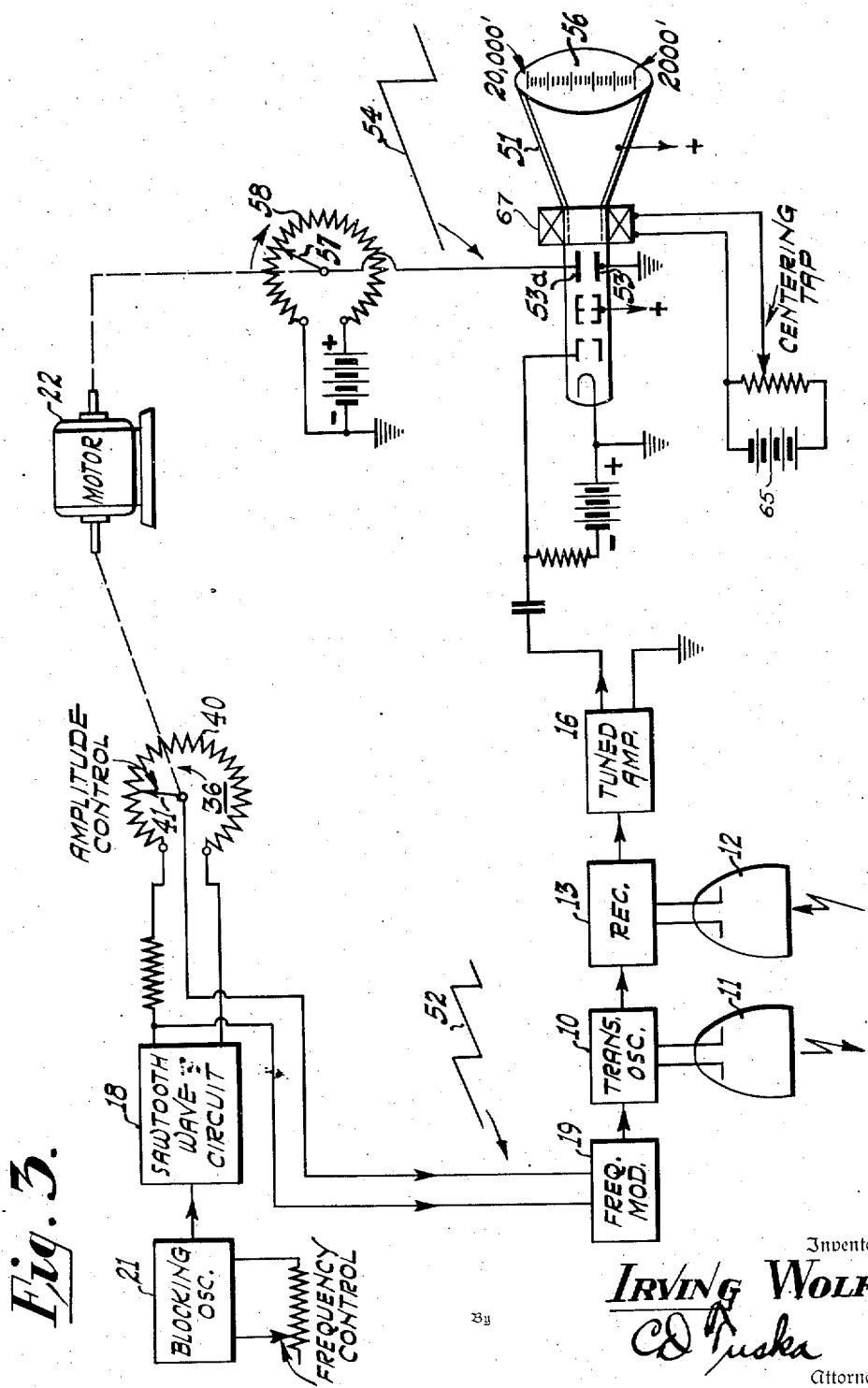

Patented June 10, 1947

2,422,157

UNITED STATES PATENT OFFICE 2,422,157

DISTANCE MEASURING APPARATUS

Irving Wolff, Haddonfield, N. J., assignor to Radio Corporation of America, a corporation of Delaware Application July 31, 1942, Serial No. 452,990

10 Claims. (Cl. 250—1.58)

1

My invention relates to distance measuring apparatus and particularly to systems of the type wherein the propagation time of a frequency modulated radio wave is utilized for determining the distance to a reflecting object.

Systems of this general type are described in Bentley Patent 2,011,392 and in Espenschied Patent 2,045,071, for example. In such systems distance, such as altitude, is determined by radiating a frequency modulated wave to the earth or other reflecting object and receiving the reflected wave in a heterodyne receiver located in the vicinity of the transmitter. The heterodyning or mixing signal for the receiver is obtained directly from the transmitter whereby the receiver output includes a signal of "difference frequency" which frequency is determined by the time required for the radiated signal to reach the reflecting object and return to the receiver.

An object of the present invention is to provide an improved system of the above-described type.

A further object of the invention is to provide an improved system of the above-described type that will indicate substantially simultaneously the distances of a plurality of reflecting objects.

A further object of the invention is to provide an improved means for and method of determining distance.

In one preferred embodiment of the invention the output signal of the heterodyne receiver is applied to a sharply tuned circuit such as a tuned amplifier which has its output circuit connected to a distance indicating means. The indicating means may comprise an element carrying an index aperture movable relative to a scale and behind which a lamp lights up when signal is passed by the tuned amplifier. Either the index aperture or the scale is moved in a definite time relation with respect to either a frequency control or an amplitude control of the frequency modulating wave whereby the rate of frequency sweep (i. e., rate of frequency deviation) of the radiated and reflected signal is different at each position of the index aperture. In this way, over the desired range of distances the beat frequency output of the receiver is brought periodically to the particular frequency passed by the tuned amplifier and the indicator lamp lights up when opposite the correct distance reading on the scale.

Figure 1:
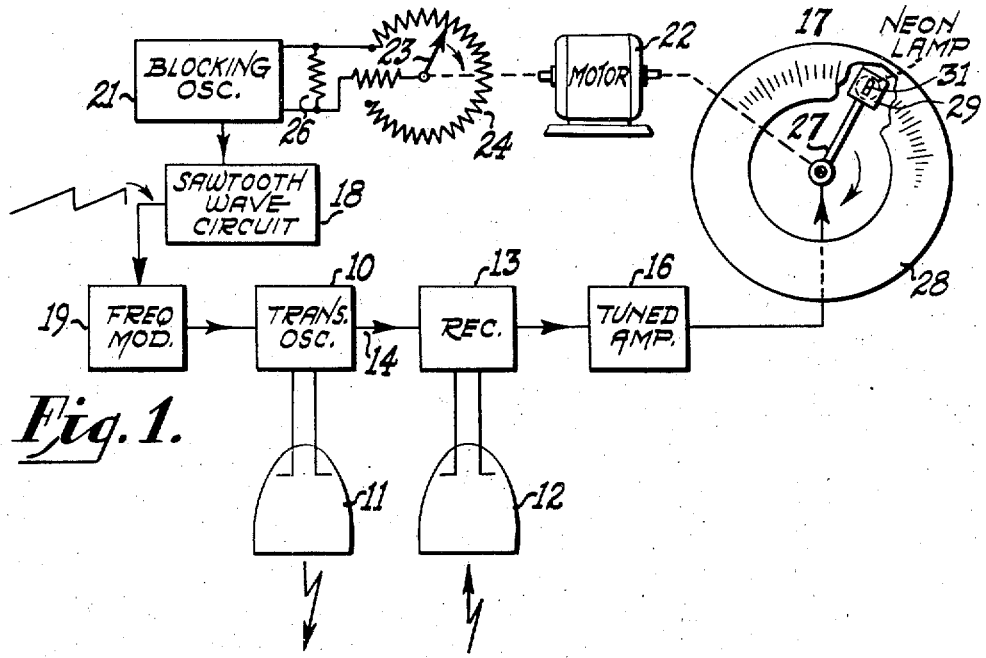
Figure 2:
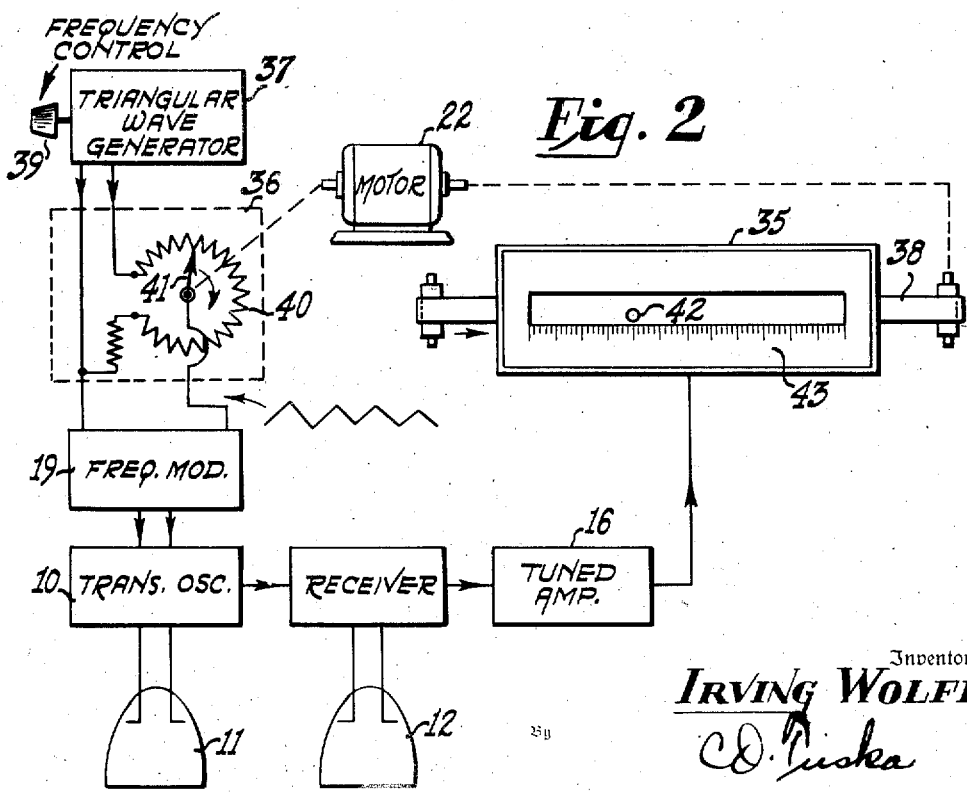

The invention will be better understood from the following description taken in connection with the accompanying drawing in which Figures 1, 2 and 3 are diagrams showing different embodiments of the invention. Like parts in the several figures are indicated by similar reference characters.

Fig. 1 shows my invention as applied to a system utilizing a rotating lamp type distance indicator. A transmitter oscillator 10 radiates a frequency modulated signal from a dipole 11. This

2 signal, after reflection, is picked up by a dipole 12 and supplied to a heterodyne receiver 13 which is also supplied over a conductor 14 with the frequency modulated signal directly from the transmitter 10. The resulting heterodyne or "difference frequency" is proportional to the length of the path of the reflected signal times the modulation frequency times the amount of frequency sweep or frequency deviation. Stated differently, the difference frequency is proportional to the length of said path times the rate of frequency deviation of the signal. This heterodyne signal is applied to a sharply tuned amplifier 16 which has its output circuit connected to a suitable indicator 17.

The frequency modulation of oscillator 10 may be accomplished by means of a sawtooth wave, for example, supplied from a circuit 18 to a frequency modulator 19. The modulator 19 may be some means, such as a reactance tube, for varying the capacity of a tuned circuit in the oscillator 10. The sawtooth wave circuit 18 has periodically recurring voltage pulses applied thereto from a suitable pulse generator such as a blocking oscillator 21. The circuits for the units 18, 19 and 21 are well known in the art and need not be described in detail. As an example of circuits for units 18 and 21, reference is made to Tolson et al. Patent 2,101,520.

As previously indicated, either the peak amplitude or the frequency (rate of recurrence) of the modulating signal may be varied as the index mark of the indicator 17 is moved. In Fig. 1 it is the frequency of the modulating wave that is varied. This may be done, for example, by varying the grid leak resistance of blocking oscillator by means of a motor 22 which drives a rotatable potentiometer arm 23 along a potentiometer resistor 24. The portion of resistor 24 that is between the contact point of arm 23 and one end of the resistor 24 is in parallel with a grid leak resistor 26 whereby the total grid leak resistance is varied to vary the blocking oscillator frequency as the arm 23 rotates.

Synchronously with the rotation of potentiometer arm 23, the arm 27 of the indicator 17 is rotated by the motor 22. The indicator arm 27 has a neon lamp or the like mounted thereon behind a transparent or translucent member carrying scale markings 28. To obtain a sharp index mark, a mask 29 having a slit aperture 31 therein may be mounted on the arm 27 in front of the neon lamp.

It will be evident that with generator 18 supplying sawtooth waves of a particular peak amplitude, the "difference frequency" output of receiver 13 is proportional to the length of the path of the reflected wave times the rate of recurrence of the sawtooth modulating wave. In other words, for a given altitude or other distance, and for a given frequency of sawtooth wave of a given peak amplitude, the receiver output has some definite frequency, such as 50,000 cycles per second, for example. Assuming, by way of example, that the amplifier 16 is tuned to pass signal only at 60,000 cycles, it will be apparent that for the example just assumed no signal could pass the amplifier 16 and the neon lamp would not light. However, the neon lamp will light, as soon as the rotation of the potentiometer arm 23 changes the rate of recurrence of the sawtooth wave to a value which makes the receiver output have a frequency of 60,000 cycles for the given distance to the reflecting object. Meanwhile, the lamp and the aperture or index mark 31 have been moved along the scale 28 to a point where the correct distance is indicated when a 60,000 cycle receiver output does flash the neon lamp.

Merely by way of example, it may be mentioned that the oscillator 10 may be varied in frequency from 60 to 600 cycles per second by the rotating potentiometer with the sawtooth wave of a constant amplitude such that the frequency sweep or frequency deviation of the radiated signal is from a sweep width of 10 megacycles to one of 1 megacycle. The potentiometer arm 23 and the indicator lamp may be rotated several times a second.

It should be understood that the frequency and attenuation controls of my system are interchangeable. This is illustrated in Fig. 2 where an amplitude attenuator 36 is driven by the motor 22 to change the amplitude of triangular waves (or sawtooth waves if preferred) while the rate of recurrence of these waves remains constant unless it is changed by a manual adjustment. Also, by way of example, a different type of indicator 35 is illustrated.

Referring more specifically to Fig. 2 the frequency modulation of oscillator 10 is accomplished preferably by means of triangular voltage waves which are produced by a suitable generator 37 and supplied through the variable amplitude attenuator 36 to the frequency modulator 19. The attenuator 36 and a belt 38 of the indicator 35 are driven synchronously by the motor 22. The generator 37 need not be described in detail as generators for producing triangular waves and sawtooth waves are well known. A control knob for manual control of the generator frequency is indicated at 39.

The amplitude attenuator 36 may be of any suitable type. It is shown, merely by way of example, as a potentiometer comprising a resistor 40 and a rotatable contact arm 41 which is coupled to the motor 22.

The particular indicator is of the type described and claimed in Barton application Serial No. 380,805, filed February 27, 1941. It comprises the moving belt 38 having an aperture 42 therein. Behind the belt 38 is a tubular neon light or the like (not shown) which is flashed when the amplifier 16 passes a signal. Thus, a flash of light acting as an index mark appears at a point opposite a scale 43 and the scale reading depends upon the location of the aperture 42 when the neon light flashes.

It should be understood that instead of varying either the modulating wave frequency or its amplitude alone, the two may be varied simultaneously. For instance, in Fig. 2 the frequency control knob 39 may be driven by the motor at the same time that the potentiometer arm 41 is being driven.

Mention may be made of the fact that the Doppler effect may spread the index mark slightly along the scale. For example, when frequency modulation is by a triangular wave, the reflection from an object ahead of the airplane may actually produce two separate index marks if the relative speed of the airplane and the object is high enough. This fact may be taken advantage of to determine at least approximately the ground speed of the airplane.

In Fig. 3 the invention is shown with a cathode ray tube indicator 51. In the example assumed, a sawtooth wave 52 is utilized for frequency modulation and its peak amplitude is varied by the motor 22 synchronously with variations in the maximum amplitude of the vertical deflection or time axis sweep of the cathode ray.

The cathode ray tube 51 is of conventional construction and includes a pair of deflecting plates 53 and 53a to which a deflecting voltage 54 is applied. The end of tube 51 carries the usual fluorescent screen (not shown) and is provided with a distance scale 56. The sawtooth wave 54 is produced by rotation of an arm 57 which moves a tap along a potentiometer resistor 58. The arm 57 is mechanically coupled to the motor 22 so that the amplitude of the deflection along the scale 56 is increased as the amplitude of the modulating wave 52 is decreased. A given altitude or other distance indicating pulse will appear at a point on the scale 56 determined by the amplitude of the vertical deflection. This action is similar to that of the previously described circuits.

It is assumed that the cathode ray tube is biased toward beam cutoff whereby the beam intensity is increased in response to passage of a signal by the tuned amplifier 16. The deflection may be centered by adjusting the amount of direct current from a source 65 flowing through a magnetic deflecting coil 67.

I claim as my invention:

1. The method of measuring distance which comprises radiating a radio wave toward a reflecting object, cyclically frequency modulating said wave to cause its frequency to change cyclically in a predetermined way with respect to time, receiving the wave after reflection from said object and heterodyning it with a portion of said modulated wave which has not been reflected whereby a signal having a beat or difference frequency is produced, periodically varying the rate of said frequency change and synchronously varying the position of an index marking means with respect to a distance scale, and producing an indication at said index marking means only in response to the frequency of said signal reaching a predetermined beat frequency value.

2. The method of measuring distance which comprises radiating a radio wave toward a reflecting object, cyclically modulating said wave to cause its frequency to change cyclically and substantially linearly with respect to time, receiving the wave after reflection from said object and heterodyning it with a portion of said modulated wave which has not been reflected whereby a signal having a beat or difference frequency is produced, cyclically varying the rate of said frequency change and synchronously varying the position of an index marking means with respect to a scale, and causing said index marking means to produce an indication only in response to the frequency of said signal reaching a predetermined beat frequency value.

3. In combination, a radio transmitter and a receiver located in the region of said transmitter, means for producing a periodic modulating wave, means for cyclically modulating said transmitter by said wave to change its frequency in a predetermined way with respect to time, means for heterodyning in said receiver said frequency modulated radio wave after reflection from an object with said frequency modulated radio wave received directly from said transmitter whereby a signal having a difference frequency is produced, an indicator comprising a scale and a relatively movable index marking means, a circuit tuned to pass signal of a certain frequency only and connected to supply signal from said receiver to said indicator to produce an index indication in response to passage of signal of said certain frequency, and means for cyclically changing the position of said index marking means with respect to said scale and for synchronously varying said rate of change in the frequency of the transmitted wave whereby the distance from said transmitter to said object may be determined from the position of said index indication with respect to the scale.

4. In combination, a radio transmitter and a receiver located in the region of said transmitter, means for producing a periodic modulating wave, means for cyclically modulating said transmitter by said wave to change its frequency substantially linearly with respect to time, means for heterodyning in said receiver said frequency modulated radio wave after reflection from an object with said frequency modulated radio wave received directly from said transmitter whereby a signal having a difference frequency is produced, an indicator comprising a scale and a relatively movable index marking means, a circuit tuned to pass signal of a certain frequency only and connected to supply signal from said receiver to said indicator to produce an index indication in response to passage of signal of said certain frequency, and means for cyclically changing the position of said index marking means with respect to said scale and for synchronously varying said rate of change in the frequency of the transmitted wave whereby the distance from said transmitter to said object may be determined from the position of said index indication with respect to the scale.

5. In combination, a radio transmitter and a receiver located in the region of said transmitter, means for producing a periodic modulating wave, means for cyclically modulating said transmitter by said wave to change its frequency in a predetermined way with respect to time, means for heterodyning in said receiver said frequency modulated radio wave after reflection from an object with said frequency modulated radio wave received directly from said transmitter whereby a signal having a difference frequency is produced, an indicator comprising a scale and a relatively movable index marking means, a circuit tuned to pass signal of a certain frequency only and connected to supply signal from said receiver to said indicator to produce an index indication in response to passage of signal of said certain frequency, and means for cyclically changing the position of said index marking means with respect to said scale and for synchronously varying the amplitude of the modulating wave whereby the distance from said transmitter to said object may be determined from the position of said index indication with respect to the scale.

6. In combination, a radio transmitter and a receiver located in the region of said transmitter, means for producing a periodic modulating wave, means for cyclically modulating said transmitter by said wave to change its frequency in a predetermined way with respect to time, means for heterodyning in said receiver said frequency modulated radio wave after reflection from an object with said frequency modulated radio wave received directly from said transmitter whereby a signal having a difference frequency is produced, an indicator comprising a scale and a relatively movable index marking means, a circuit tuned to pass signal of a certain frequency only and connected to supply signal from said receiver to said indicator to produce an index indication in response to passage of signal of said certain frequency, and means for cyclically changing the position of said index marking means with respect to said scale and for synchronously varying the frequency of the modulating wave whereby the distance from said transmitter to said object may be determined from the position of said index indication with respect to the scale.

7. In combination, a radio transmitter and a receiver located in the region of said transmitter, means for producing a periodic modulating wave, means for cyclically modulating said transmitter by said wave to change its frequency in a predetermined way with respect to time, means for heterodyning in said receiver said frequency modulated radio wave after reflection from an object with said frequency modulated radio wave received directly from said transmitter whereby a signal having a difference frequency is produced, an indicator comprising a scale and a relatively movable index marking means, a circuit tuned to pass signal of a certain frequency only and connected to supply signal from said receiver to said indicator to produce an index indication in response to passage of signal of said certain frequency, and means for cyclically changing the position of said index marking means with respect to said index marking means with respect to said scale and for synchronously varying both the amplitude and the frequency of the modulating wave whereby the distance from said transmitter to said object may be determined from the position of said index indication with respect to the scale.

8. In apparatus for determining distance, a radio transmitter and a receiver located in the region of said transmitter, means for producing a periodic modulating wave that can be varied in amplitude and in frequency, means for frequency modulating said transmitter by said wave, means for heterodyning in said receiver said frequency modulated radio wave after reflection from an object with said frequency modulated radio wave received directly from said transmitter whereby a signal having a difference frequency is produced, an indicator comprising scale and a relatively movable index marking means, a sharply tuned circuit connected to supply signal from said receiver to said indicator and means for repeatedly changing the position of said index marking means with respect to said scale and for synchronously varying at least one of said two variable characteristics of modulating wave whereby the distance from said transmitter to said object is shown by the position of said index mark with respect to the scale.

9. The invention according to claim 8 wherein said modulating wave is triangular in wave shape whereby the index mark is spread by the Doppler effect to indicate the speed of said apparatus with respect to said reflecting object.

10. In combination, a radio transmitter a receiver located in the region of said transmitter, means for producing a periodically recurring modulating wave, means for cyclically modulating said transmitter by said wave to change its frequency substantially linearly with respect to time, for heterodyning in said receiver said frequency modulated radio wave after reflection from an object with said frequency modulated radio wave received directly from said transmitter whereby a signal having a difference frequency is produced, an indicator comprising a scale, a lamp and an index marking means that is movable relative to said scale, a circuit tuned to pass signal of a certain frequency only and connected to supply signal from said receiver to said indicator to light said lamp in response to passage of a signal of said certain frequency, and means to cyclically changing the position of said index marking means with respect to said scale and for synchronously varying said rate of change in the frequency of the transmitted wave whereby the distance from said transmitter to said object may be determined from the position of said index marking means with respect to the scale the instant said lamp lights.

IRVING WOLFF.